Figure 1:
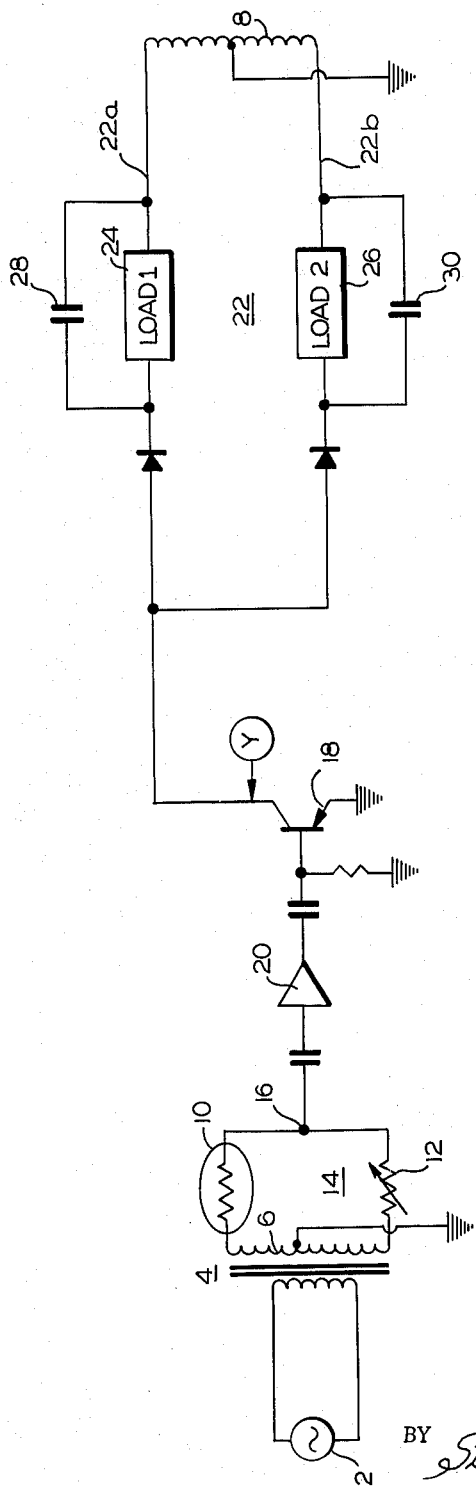

March 29, 1966  B. BURLEY  3,243,597
ELECTRONIC SYSTEM RESPONSIVE TO OPPOSITE
SENSES OF CONDITION DEVIATION
Filed June 29, 1962  2 Sheets-Sheet 1

INVENTOR
BILLY BURLEY

BY Scrivener & Parker
ATTORNEYS

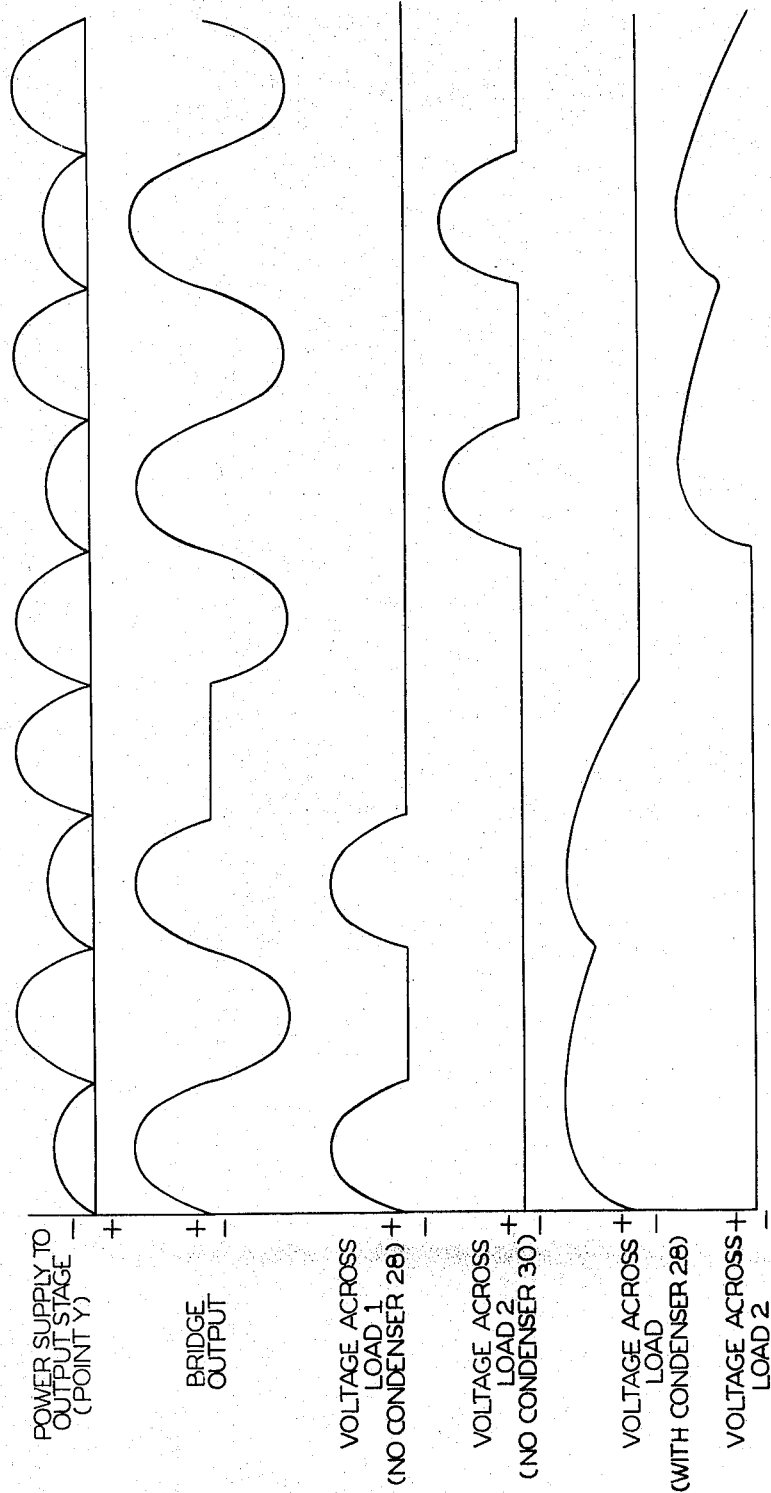

United States Patent Office 3,243,597
Patented Mar. 29, 1966

3,243,597
ELECTRONIC SYSTEM RESPONSIVE TO OPPOSITE
SENSES OF CONDITION DEVIATION
Billy Burley, Dallas, Tex., assignor, by mesne assignments,
to Johnson Service Company, Milwaukee, Wis., a corporation of Wisconsin
Filed June 29, 1962, Ser. No. 206,349
3 Claims. (Cl. 307—39)

This invention relates generally to an electronic system that affords modulating control in response to deviations in a condition in opposite senses from a predetermined value, and more particularly to a condition-responsive electronic system affording modulating control over a first device when a condition deviates in one sense from a predetermined value, and modulating control over a second device when the condition deviates in the opposite sense.

In my companion patent application Serial No. 206,-348 filed June 29, 1962, entiled, "Condition-Responsive Electronic System," an electronic control is disclosed that affords modulating response to deviations of a condition in one sense from a predetermined value, said control being deactivated for deviations of the conditions in the opposite sense.

The present invention relates to an improvement over the electronic control disclosed in the aforementioned application and is characterized by the fact that modulating control is afforded alternately over at least two current-responsive loads in accordance with the sense of deviation in a condition from a predetermined value. The present invention is generally analogous to my copending application Serial No. 206,347 filed June 29, 1962, and entitled, "Electronic Control Responsive to Opposite Senses of Condition Deviation."

In heating and air conditioning systems, it is often desired to regulate the supply of heating and cooling fluids to respective demands in accordance with deviations in temperature from a predetermined value. Regulating valves connected in the supply conduits are operated by condition-responsive electronic controls to maintain room temperature at a constant predetermined value. In the past, complicated control systems incorporating manually operable switches, relays and other external devices have been proposed for operating one regulator during one set of temperature conditions and for operating another regulator during another set of conditions. In addition to their complexity and attendant high cost, the known systems are often unreliable due to mechanical failure or to human error in operation. The present invention affords simple means for automatically operating a correct one of two load devices in accordance with the sense of deviation of a condition from a predetermined value without the use of the expensive control means of the prior art.

Accordingly, a primary object of the invention is to provide a condition-responsive electronic system affording automatic alternate modulating control over two or more load devices in accordance with the sense of deviation of a condition from a predetermined value.

A more specific object of the invention is to provide a condition-responsive control system comprising two current-responsive loads, load circuit means—including an A.-C. reference voltage source, full-wave rectifier means, and current-level controlling means—operable to supply current to said loads, and condition-responsive means cooperating with said controlling means to effect alternate opposite states of energization of said loads in response to deviations in a condition in opposite senses from a predetermed value. The current level control means of the present invention comprises an electronic device having a pair of output circuit electrodes and a control electrode controlling the flow of current between the output electrodes. A transistor is preferably used as the electronic device. The condition-responsive means comprises a variable resistance, inductance, capacitance or impedance A.-C. bridge network responsive to conditions such as temperature, humidity, pressure or the like. The bridge network is operable to apply a signal voltage upon the control electrode of the electronic device that has a magnitude which is a function of the degree of condition deviation and a phase relationship relative to the reference voltage that is dependent upon the sense of condition deviation. The electronic control is so designed that when the signal and reference voltages have one phase relationship, modulating control is afforded over one load, and when the two voltages have the opposite phase relationship, modulating control is afforded over the other load.

A further object of the invention is to provide a condition-responsive electronic system comprising a transistor, a source of A.-C. reference voltage, full-wave rectifier means connected with said source and including a pair of branches having alternate opposite states of energization, a pair of current-responsive loads connected in series, respectively, in said branches, load circuit means connecting said full-wave rectifier means in series with the emitter to collector circuit of said transistor, and a condition-responsive bridge network connected with the transistor base electrode and including an energizing winding inductively coupled with said voltage source.

Other objects and advantages of the invention will become apparent from a study of the following specification when considered in conjunction with the accompanying drawing, in which:

FIG. 1 is a partially diagrammatic circuit diagram of one embodiment of the condition-responsive electronic control; and FIG. 2 illustrates the voltage waveforms at various points of the circuit of FIG. 1 for deviations of a condition above and below a predetermined value.

Referring to FIG. 1, an A.-C. voltage source 2 is connected with the primary winding of transformer 4 having grounded center-tapped secondary windings 6 and 8. Winding 6 is connected in series with condition-responsive resistor 10 (which may comprise, for example, a thermistor) and a variable resistor 12 to define bridge network 14. Bridge output junction 16 is capacitively coupled with the base electrode of transistor 18 via amplifier 20. Secondary winding 8 is connected in a conventional full-wave rectifier network 22 the branches 22a and 22b of which have alternate opposite states of energization. First and second current-responsive loads 24 and 26 are connected in series in branches 22a and 22b, respectively. Capacitors 28 and 30 are connected in parallel across current-responsive loads 24 and 26, respectively. The loads may be the heating resistances of expansible fluid actuators, relay windings, servo-valve windings, or the like. The negative junction of rectifier bridge 22 is connected with the collector electrode of transistor 18 the emitter electrode of which is connected with ground. The specific details and operation of the electronic control are disclosed in my aforementioned patent application entitled, "Condition-Responsive Electronic System."

*Operation*

Assume that current-responsive loads 24 and 26 are electrically-operated actuators controlling regulating valves connected in suppjly conduits containing fluids of dissimilar temperatures. Assume also that resistor 12 is set to establish a balanced condition of bridge 14 when a sensed temperature (for example, room temperature)

equals a predetermined value (for example, 75° F.), and that transistor 18 is biased to cutoff.

When room temperature equals set temperature, bridge 14 is balanced, transistor 18 is non-conductive and both loads 24 and 26 are deenergized. Successive negative half-cycles of the reference voltage supplied by rectifier network 22 are applied to the collector electrode of transistor 18.

Assume now that room temperature falls below set temperature. Condition-responsive bridge 14 is unbalanced in one sense from null and a signal voltage is produced at junction 16 that has a given phase relationship relative to the reference voltage and a magnitude that is a function of the degree of deivation of room temperature from set temperature. This signal voltage is amplified and is applied to the base electrode of transistor 18. Successive half-cycles of the full-wave rectified reference voltage are applied to the collector electrode of transistor 18, and during alternate half-cycles of the amplified signal voltage the transistor becomes conductive. During the remaining half-cycles of signal voltage, the transistor is non-conductive. Assuming that the phase relationship between the signal and reference voltages is such that transistor 18 becomes conductive during those half-cycles of negative voltage supplied by branch 22a of full-wave rectifier network 22, then load 24 senses pulses of a given polarity having a magnitude that is a function of the signal voltage, whereby the effective D.-C. level of the load current sensed by load 24 is a function of the degree of deviation of room temperature from set temperature. Since the transistor 18 is non-conductive during those periods when negative half-cycles developed by rectifier network branch 22b are applied to the collector of transistor 18, load 26 is continuously de-energized for temperature deviations below set temperature. Thus it is apparent that when room temperature decreases below set temperature, modulating response of the regulating valve controlled by load 24 is achieved in accordance with the magnitude of the condition deviation, and load 26 remains continuously de-energized.

Assume now that room temperature exceeds set temperature. Bridge 14 is now unbalanced in the opposite sense from null and the phase relationship between the signal and reference voltages is reversed. Transistor 18 will now be conductive during those alternate negative half-cycles that are supplied to the collector electrode by rectifier network branch 22b. Consequently, load 26 senses periodic pulses of the same polarity having a magnitude that is a function of the level of the signal voltage, whereby the load current through load 26 has an effective D.-C. level that is a function of the degree of temperature deviation between room temperature and set temperature. Load 24 is continuously de-energized when room temperature exceeds set temperature.

Thus it is apparent that the electronic system of the present invention affords modulating control over a first load and de-energization of a second load for condition deviations in one sense from a predetermined value, and de-energization of the first load and modulating control over the second load for condition deviations in the opposite sense. When changeover means are provided for reversing the phase relationships between reference and signal voltages as disclosed in my companion application Serial No. 206,343 filed June 29, 1962, and entitled, "Electronic System Affording Reversible Modulating Control," the states of energization of the loads in response to opposite senses of condition deviations may be reversed.

If desired, shunting capacitors 28 and 30 may be provided for smoothing the D.-C. load currents flowing through loads 24 and 26 when the respective branches 22a and 22b are energized. As shown in the waveform diagrams of FIG. 2, when the measured condition deviates in one sense to effect energization of load 24, capacitor 28 discharges during those half-cycles in which transistor 18 is nonconductive to level out the effective D.-C. load current. Similarly, when load 26 is energized, capacitor 30 discharges during the non-conductive periods of the transistor to level out the effective D.-C. load current. Thus if the current-responsive loads should be D.-C. relays, the capacitors serve to prevent chattering of the relay contacts.

Transistor 18 has been illustrated as being of the p-n-p type. It is apparent, however, that with appropriate modification of the electronic control, transistors of the n-p-n type or other electronic control devices could be utilized equally as well.

While the invention has been disclosed in conjunction with a heating and air conditioning system, the utility of the control system is not to be construed as being limited to this specific application. Certain modifications may be made in the apparatus disclosed without deviating from the invention set forth in the following claims.

What is claimed is:

1. An electronic system affording selective modulating control over one of two load devices in accordance with the sense and magnitude of the deviation of a condition from a predetermined value, comprising network means including a first energizing winding having a center-tapped first terminal, a second terminal, and a pair of branches each connected at one end with said second terminal and at the other end with opposite ends of said winding, each of said branches including in series a current-responsive load and a uni-directionally conductive device, said devices having the same polarity relative to said second terminal;

current-controlling means comprising a pair of power circuit electrodes connected with said network terminals, respectively, and a control electrode;

normally-balanced alternating current condition-responsive bridge network means connected with said control electrode for regulating the current flow between said power circuit electrodes, said bridge network means including a second center tapped alternating current energizing winding and having a condition responsive means in said bridge network to control the amplitude of the output signal and providing a first signal of a given frequency for deviation of the condition in one direction and a second signal of the same frequency and 180 degrees out of phase with respect to the first signal for deviation of the condition in an opposite direction; and means energizing said first and second windings with alternating-current voltages having the same frequency and given phase relationship, whereby for deviations in the measured condition in one sense from a predetermined value a first one of said loads is de-energized and the other load is energized as a function of the magnitude of the condition deviation, and for condition deviations in the opposite sense said other load is de-energized and said first load is energized as a function of the magnitude of the condition deviation.

2. Apparatus as defined in claim 1 wherein said current controlling means comprises a transistor the emitter and collector electrodes of which constitute said power circuit electrodes and the base electrode of which constitutes said control electrode.

3. Apparatus as defined in claim 2 wherein said condition-response bridge network means further includes a third terminal connected with said control electrode, and a pair of branches each connected at one end with said third terminal and at the other end with opposite ends of said second center tapped alternating current winding and having the output signal generated between the center tap of the second winding and the third terminal, one of said branches including condition-responsive means having an electrical characteristic that varies as a function of the deviation of a condition from a given value, and the other of said branches including bridge balancing means for balancing said bridge when the condition has said given value.

References Cited by the Examiner

UNITED STATES PATENTS

| | | | |
|---|---|---|---|
| 930,325 | 8/1909 | Thomas | 307—42 |
| 2,414,570 | 1/1947 | Tubbs | 317—156 X |
| 2,585,005 | 2/1952 | Godshalk et al. | 323—75 |
| 2,897,379 | 7/1959 | Hinsdale | 307—88.5 |
| 2,901,676 | 8/1959 | Mittag | 323—75 |
| 2,907,932 | 10/1959 | Patchell | 317—148.5 |
| 3,149,224 | 9/1964 | Horne | 219—497 |

ORIS L. RADER, *Primary Examiner.*

GEORGE J. BUDOCK, LLOYD McCOLLUM,

*Examiners.*

L. R. CASSETT, T. J. MADDEN, *Assistant Examiners.*